March 30, 1937. J. P. LYNN Re. 20,314
PENCIL
Original Filed Sept. 29, 1933
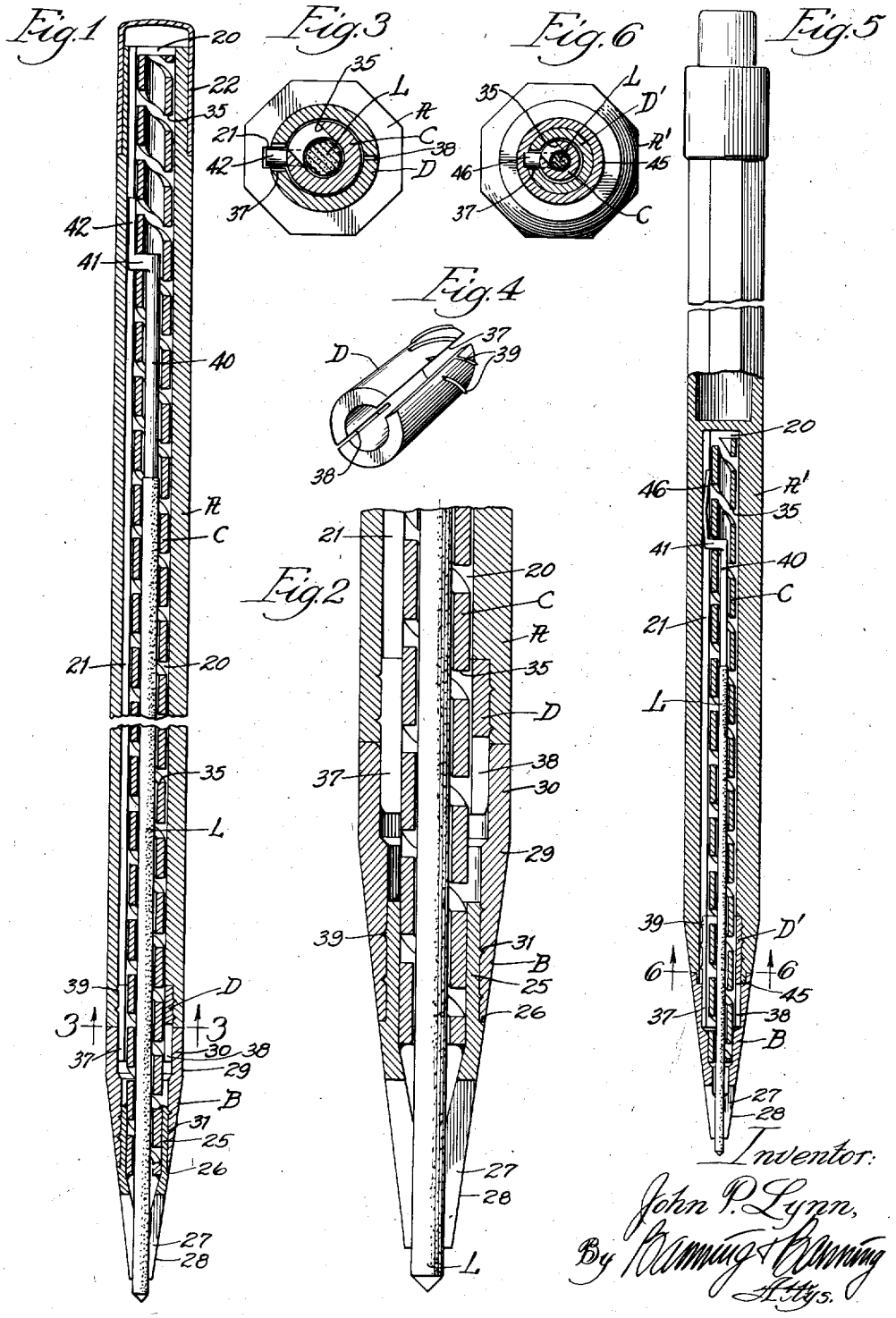

Reissued Mar. 30, 1937

Re. 20,314

UNITED STATES PATENT OFFICE 20,314

PENCIL

John P. Lynn, Chicago, Ill., assignor to Dur-O-Lite Pencil Company, Sycamore, Ill., a corporation of Delaware Original No. 1,997,424, dated April 9, 1935, Serial No. 691,422, September 29, 1933. Application for reissue June 18, 1936, Serial No. 85,920

5 Claims. (Cl. 120—18)

This invention relates generally to mechanical pencils having a lead propelling means adapted to be actuated by rotation of a tip relative to the body. The present improvements are concerned particularly with means for frictionally holding the tip in cooperative relation with the body, and with means for steadying the tip relative to the body.

These and other objects, as will hereinafter appear, are attained in a pencil having a construction of which certain suggestive embodiments are set forth in the accompanying drawing, wherein—

Figure 1 is an enlarged longitudinal sectional view through the pencil;

Fig. 2 is an enlarged fragmentary sectional view of the tip end of the pencil;

Fig. 3 is an enlarged transverse sectional view, taken on line 3—3 of Fig. 1;

Fig. 4 is a view in perspective of the coupling sleeve per se;

Fig. 5 shows partly in section and partly in elevation a modified pencil construction; and Fig. 6 is an enlarged transverse sectional view, taken on line 6—6 of Fig. 5.

Referring to Figs. 1 to 4 inclusive, I have shown therein a pencil having a body A made desirably of a suitable composition material, and provided with an axial chamber 20 which may extend for the entire length of the body. A radial groove 21 in which may track the feed pin of the lead propelling mechanism is formed in the chamber throughout its length. At its head, the exterior surface of the body is slightly recessed to receive in flush relation a cap 22 which forms a closure for the chamber at that end.

The lower or writing end of the body is equipped with a tip B which is movably and rotatably connected thereto. As shown best in Fig. 2, the tip comprises a cylindrical tube 25 formed exteriorly with a shoulder 26 below which the tip extends in the form of a cone having slits 27 to provide jaws 28.

Formed over the tip cylindrical tube is an outer grip portion 29 of bakelite or other appropriate material. This grip which starts from the shoulder 26 extends upwardly in cone fashion as a continuation of the lower cone walls of the tip. In its upper region, the grip portion proceeds cylindrically as at 30, its diameter, inside and out, being such as to coincide with the corresponding surfaces of the body when fitted in abutting relation thereto. The connection between the tip tube 25 and grip portion 29 may be of any approved kind, steep pitched threads 31 being suggested for the purpose.

Fitted within the tube 25 of the tip is one end of a spiral tube C. This tube may be brazed or otherwise securely anchored within the tip so as to extend upwardly therefrom through the axial chamber of the pencil body for the full length thereof. The spiral tube may conveniently be formed from a flat ribbon of metal which is rolled about a suitable mandrel, the convolutions of the tube being separated to leave an open spiral slot 35 which continues wtihout interruption for the full length of the tube.

To connect the tip removably and also rotatably to the body, whereby it may serve as an operating medium for the lead propelling mechanism, I utilize a coupling sleeve D (see Fig. 4) which, in the form shown, consists of a small metal plate bent into cylindrical form with its proximate edges sufficiently separated to provide an open slot 37. A slit 38 may also be provided through the walls of the sleeve for perhaps one-half its length on the side thereof which is preferably opposite the slot 37. The sleeve end remote from the slit 38 is desirably provided on its exterior with steep pitched threads 39 which have capacity to take into the material forming the body of the pencil, when the sleeve is screwed into position therewithin, thereby anchoring the sleeve in place. For reception of the coupling sleeve within the body, the axial chamber therewithin is desirably enlarged somewhat at the lower end of the pencil, whereby the inner surface of the sleeve is disposed in coincidence with the chamber which extends longitudinally of the body. When the sleeve is anchored in place, it is positioned rotatively so that the slot 37 aligns with the groove 21 in the chamber.

The threaded end of the coupling sleeve may be permanently and immovably embedded within the enlarged chamber at the lower end of the pencil body. The remaining portion of the sleeve, however, viz., the end wherein the slit 38 is formed, remains protruded beyond the end of the pencil body. By reason of the slot 37 and slit 38, the walls of the sleeve are divided into spring sections which tend normally to expand. When the tip, together with its helical tube, is applied to the pencil body, the tube is extended through the coupling sleeve, free of contact therewith; the inner surface of the grip portion of the tip, however, is engaged by the outer surface of the coupling sleeve spring sections which are free for radial expansion. Accordingly, the application of the tip to the body requires that these sections be slightly compressed. They remain constantly under tension except during such brief periods as the tip is removed from the pencil. The connection described is meritorious because of the enhanced area of the contacting surfaces which cooperate frictionally to hold the tip to the pencil and steady the tip in its position thereupon. The upper end of the grip portion of the tip lies in abutting relation to the lower end of the pencil body, whereby the one part supports the other to resist any lateral deflection in response to forces which may be set up in use of the pencil.

The interior of the helical tube forms a guide for a lead L. The length of this lead may be nearly equal to that of the pencil, thereby obviating the need for frequent renewals. At its lower end the lead is gripped by the spring jaws 28 of the tip so as to be held properly in place. The lead may be advanced, however, as required for use by a feed mechanism which includes the tip, helical tube, and radial body groove, already described, together with a feed pin 40 having a lateral bend 41 extending through the spiral groove of the tube to lie upon the outside thereof. The bend terminates in a head 42 extending longitudinally of the pencil for a short distance so as to be receivable within the radial groove 21. The feed pin is positioned at the upper end of the lead which is guided within the spiral tube, and when the latter is rotated in response to a corresponding movement of the tip, the feed pin is held rotatively stationary so as to move longitudinally of the spiral tube, thereby advancing the lead. This operation may be continued from time to time through such distances as necessary to advance the lead until it is entirely consumed.

A generally similar construction of pencil is illustrated in Figs. 5 and 6, and the parts thereof which correspond with like parts of the pencil shown in Figs. 1 to 4 inclusive bear generally similar reference numerals. To provide a bearing which will maintain the tip in centered relation to the body, the pencil body A′ is formed at its lower end with a neck 45 surrounding the coupling sleeve D′. The walls forming the grip portion of the tip are interiorly recessed, as required, for reception of the neck which bears against the tip grip portion to maintain the tip in perfect axial alignment relative to the body. In one other respect the construction of Fig. 5 differs from that previously described, viz., in the form of the feed pin head 46 which tracks in the groove 21. This head, as shown in Fig. 5, is outwardly bowed or sprung so as to exert a pressure against the bottom of the groove 21, whereby loose movement of the feed pin is prevented. With such a construction the feed pin will not tend to move lengthwise within the spiral tube, in response to force of gravity, but will remain in whatever position it is adjusted to.

I claim:

1. A pencil comprising a body member having an axial opening, a tip member fitted to one end of the body, co-operating means on the tip and body providing a lead propelling mechanism, and means anchored within the body protruding therefrom and exerting a radial thrust adapted for frictional engagement with an inner cylindrical surface of the tip to secure the latter rotatably and removably to the body, said means having a longitudinal slot extending into the body and tip and closed at one side by the inner walls of said body and tip providing a continuous guideway between said relatively movable members for the lead propelling mechanism.

2. A pencil comprising a body member having an axial opening, a tip member having an axial opening in communication with that of the body, means anchored within the opening of the one part and protruding therefrom for radial expansion within the opening of the other part whereby the two are connected in rotatable and releasable relation, said means having a longitudinally extending slot cooperating with the inner walls of said relatively movable body and tip members to provide a continuous guideway between said members, and a lead propelling mechanism operable through said body and tip members in said guideway.

3. A pencil comprising a body member in one of whose ends is an axial opening, a tip member having one end fitted to the body end in abutting relation thereto, the tip being provided at said end with an axial opening in coincidence and communication with that of the body, and a coupling sleeve anchored in the body opening and extended therefrom to lie within the tip opening, said sleeve having a slot extending from end to end thereof adjacent the inner walls of said body and tip and providing with said walls a continuous guideway between said members, a propelling mechanism slidable in said slot through said members, the portion of the coupling sleeve lying without the body opening having a spring jaw expansible in a radial direction for frictional engagement with the walls surrounding the tip opening whereby to connect the tip to the body in releasable rotatable relation and provide continuous means between said body and tip for guiding the lead propelling mechanism therethrough.

4. A pencil comprising a body having an axial chamber, a tip fitted to one end of the body, lead propelling mechanism extending from the tip to lie interiorly of the body chamber, a tube anchored in the body and having one end protruded exteriorly of the body, and means at the protruding end of the tube exerting an outward radial thrust for frictional engagement with the tip to secure the latter to the body in rotatable and releasable relation thereto, said tube having an open-ended slot cooperating with the inner walls of said body and tip to provide a guideway for said lead propelling mechanism between said body and tip.

5. A pencil comprising a cylindrical body member having an axial opening, a tip body member having an axial opening at one end in communication with that of the body and a lead gripping tip portion anchored in the opposite end thereof, a relatively short expansible coupling sleeve anchored within the axial opening of one body part and protruding therefrom for outward expansion within the axial opening of the other body part whereby the two are connected in rotatable and releasable relation, and a lead propelling mechanism comprising a spiral tube-like member extending through the sleeve and tip body member for attachment at one end to the lead gripping tip portion, the opposite end portion of the tube being disposed within the axial opening of the body member above the coupling sleeve and receiving lateral support from the cylindrical wall of said body.

JOHN P. LYNN.